Nov. 4, 1958 H. L. WIRT 2,858,673
SECTIONAL LINER STRUCTURE FOR COMBUSTOR
Filed June 28, 1955
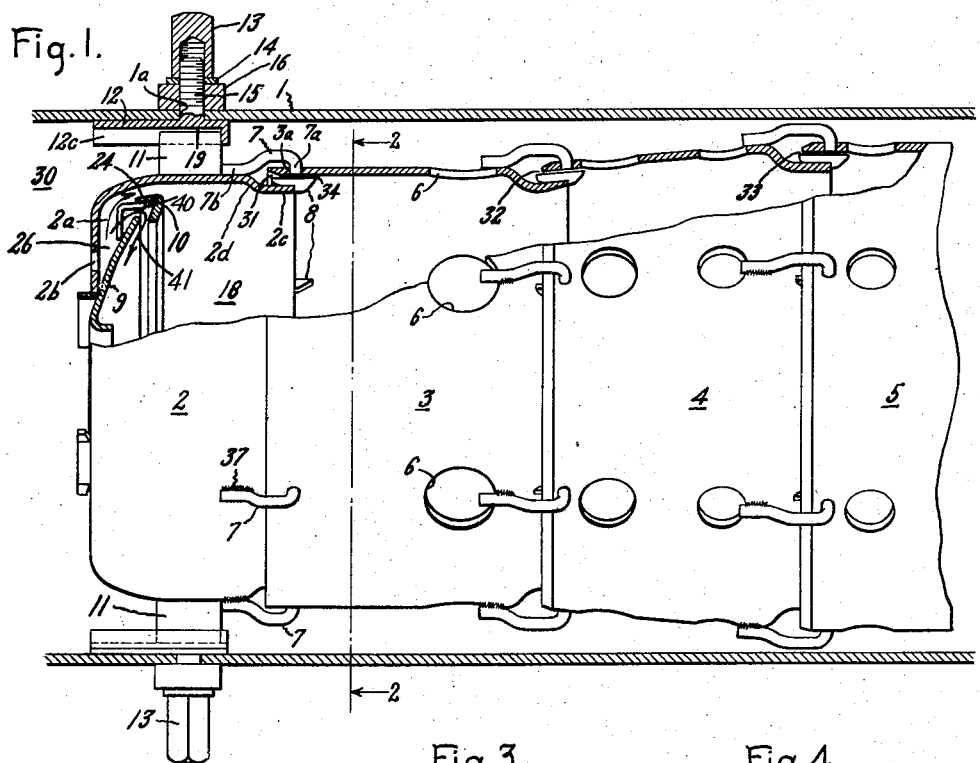
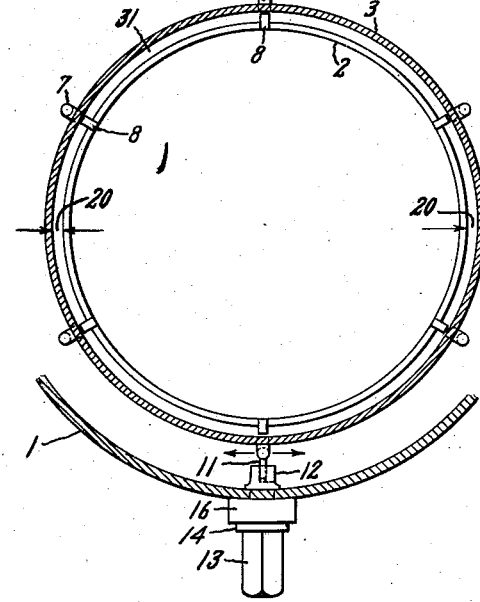
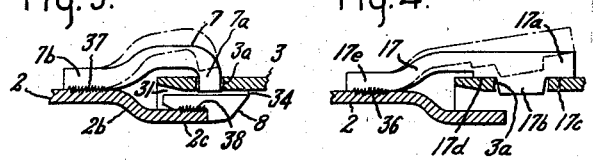
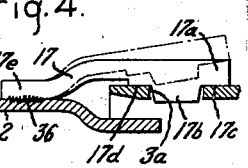
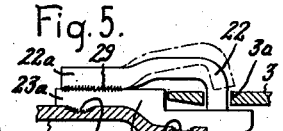
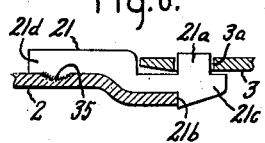
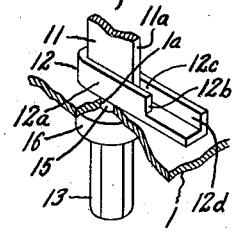
Inventor:
Harrison L. Wirt
by *Kiess*
His Attorney

United States Patent Office 2,858,673
Patented Nov. 4, 1958

2,858,673

SECTIONAL LINER STRUCTURE FOR COMBUSTOR

Harrison L. Wirt, Schenectady, N. Y., assignor to General Electric Company, a corporation of New York Application June 28, 1955, Serial No. 518,613

7 Claims. (Cl. 60—39.65)

This invention relates to combustion devices, particularly to a combustor having a sectional liner cooled by a sheath of air admitted through nozzles defined by the adjacent sections.

The invention is particularly applicable to combustors of the type disclosed in U. S. Patent 2,601,000 to A. J. Nerad, issued June 17, 1952 and assigned to the same assignee as the present application. This combustor comprises a substantially cylindrical outer housing and disposed therein a cylindrical liner structure spaced from the outer housing to define an annular supply passage communicating with longitudinal rows of circular combustion air inlet ports. The liner assembly comprises a dome member closing one end and a plurality of separate circular sections having adjacent end portions arranged in concentric radially spaced relation to define a series of annular nozzles for injecting cooling air to form a cooling and insulating sheath along the inner surface of the next succeeding section. The end dome is connected to the outer housing by brackets or other equivalent structure and the liner sections are connected to the end dome. The ends of the adjacent sections are held in correct radial and axial relationship by connectors disposed at various points around the periphery of the liner and extending across the annular nozzle defined between the adjacent liner sections. This arrangement has been found particularly effective in preventing the deposition of carbon on the liner wall, with the resulting tendency to produce "hot spots" and the accompanying tendency for the liner to buckle or burn through.

One form of connector which has been employed consists of relatively large sheet metal clips welded to the adjacent sections. These clips serve to both radially and axially align the adjacent sections. A disadvantage of this construction is that the clips have been found to present substantial obstructions to the flow of cooling air which, as described above, flows axially through the annular space between successive liner sections. Immediately downstream from each clip, a small area of the liner wall is shielded by the clip from the stream of cooling air, with the resulting tendency to produce "hot spots" at those areas of the liners.

The large brackets heretofore used for securing the sectional liner to the outer housing also present a substantial obstruction to the flow of air in the annulus between the liner and outer housing.

Other disadvantages resulting from the use of wide sheet metal clips are difficulty of assembly and lack of provision for adjustment of the concentricity between the adjacent sections.

Accordingly, an object of this invention is to provide improved connecting means for the sections of a combustor liner which will not substantially interfere with the effective cooling of the inner and outer walls of the liner.

A further object is to provide an improved sectional liner structure which can be easily assembled and repeatedly disassembled for servicing, without replacement of the connecting means.

A still further object is to provide a connecting arrangement for the adjacent liner sections which can be easily adjusted to concentrically align the annulus between the liner sections.

Other objects and advantages will become apparent from the following description, taken in connection with the accompanying drawings in which Fig. 1 is a partial sectional assembly view of a gas turbine combustor having a liner assembled in accordance with the invention, Fig. 2 is a section taken along the lines 2—2 of Fig. 1, Fig. 3 is a detailed view showing the connection between the sectional liners as disclosed in Fig. 1, Figs. 4, 5, and 6 are alternative forms of connecting means, and Fig. 7 is a partial sectional view in perspective of the connection between the end dome and the combustor outer housing.

Generally stated, the objects of the invention are attained by providing spacer means supporting the inner liner relative to the outer housing, with special adjustable and readily disengageable connecting means for holding adjacent liner sections together.

Referring now more particularly to Fig. 1, the combustor is illustrated as comprising an outer housing 1 defining at one end an inlet passage 30 for receiving air under pressure from a suitable compressor (not shown). The liner, which serves to define the combustion space proper, comprises a plurality of coaxial substantially cylindrical sections indicated generally at 2, 3, 4, and 5. Section 2 is substantially hemispherical in shape and along with the inner cap 9 comprises the "end dome assembly." This "end dome assembly" is disclosed in my copending application, Serial No. 510,735, filed May 25, 1955 and assigned to the assignee of the present invention. This invention need not be described in detail here except to note that air from the inlet passage 30 passes through a plurality of metering holes 2b in the cowl 2, diffuses uniformly through the air supply space 26 defined between the cowl 2 and cap 9 and enters the primary combustion space 18 of the liner through the annular nozzle 24 defined between the baffle 10 and the cowl 2. The inner surface of cowl 2 is thus cooled by the air flowing along the inner surface as indicated by arrow 2a in Fig. 1. The baffle 10 connected to end cap 9 by a plurality of circumferentially spaced brackets 40 serves to deflect a portion of the air received from air supply nozzle 26 toward the fuel nozzzle (not shown) to cool the inner portion of the cap 9 in a manner indicated by arrow 41.

The cowl 2 is disposed relative to the outer housing 1 by a pair of diametrically opposed supports 11. These supports 11 comprise a thin flat plate welded at its inner end to the outer portion of the cowl 2 and its outer end is disposed in the slot 12c (Fig. 7) in a special elongated bolt head 12a. The bolt head 12a is cut away at 12b, on one side of slot 12c, for ease of assembly as will be apparent from the method of assembly to be described later. The bolt 12 has a theaded portion 15 which extends through an opening 1a in the housing 1 and is adapted to receive a spacer 16, lock washer 14, and nut 13 for securing the bolt to the housing 1. The plate 11 has a very thin cross sectional area 11a exposed to the air flow between the cowl 2 and casing 1. The air is thus permitted to flow substantially unimpeded past the support, which is desired for reasons to be described later. A space 19 is provided between the wing support 11 and bolt 12 to permit the cowl 2 and liner sections secured thereto to expand and contract radially relative to the casing 1 in response to changes in temperature.

The downstream end of the cowl 2 and adjacent sections are provided with an annular louver-defining portion including a radially inwardly extending wall portion 2d, and an axially extending portion 2c which overlaps the inner surface of the next adjacent liner section and is radially spaced therefrom to define the annulus 31 for the admission of cooling and insulating air. This cooling air serves to cool the inside of the liner 3 and with the air still flowing on the outside will prevent "hot spots" from occurring which would result in a relatively short life of the liner due to "burn out." For a more complete discussion of this cooling action, reference is made to U. S. Patent 2,699,648 to D. C. Berkey, issued January 18, 1955 and assigned to the same assignee as the present application.

The cylindrical liner section 3 is provided with six circumferentially spaced air inlet ports 6, the spacing and arrangement of which are in accordance with the above identified patent of A. J. Nerad. This liner section may also be provided with a hole for admitting the end portion of a suitable spark plug for ignition, and a port communicating with a "cross ignition tube" for communicating flame from one combustor to another. These openings are not illustrated in Fig. 1 because they are not material to an understanding of the present invention.

In order to obtain long life for the liner and reduce or eliminate the deposition of carbon so that only infrequent inspection or cleaning is required, it has been found advisable to connect the adjacent liner sections together with connectors which present very little interference with the flow of cooling air, especially through the annular nozzle formed between the adjacent liner sections. Any interference in the flow of the cooling air creates "hot spots" at the place not cooled which results in the burning out of the liner at that point. It is also very important that the radial width of this annular nozzle be maintained uniform so that a uniform cooling effect of the liners is achieved.

To accomplish this, the liner section 3 is axially and concentrically located relative to the cowl 2 by a series of links 7 and spacers 8 of the type illustrated in detail in Fig. 3. In the drawing, as shown, six of these links and spacers are disposed around the circumference of the liner. However, this is by way of example only since a different number may be utilized.

The link 7 may be fabricated of a small diameter wire having an end portion 7b welded to the cowl 2 at 37 and a hook portion 7a extending into opening 3a defined by the liner section 3. The hook portion 7a fits into opening 3a with very little clearance. The portion 7a provides a wearing surface against which the surface of liner section 3 defining opening 3a abuts. The clearance between the link portion 7a and opening 3a determines the amount the liner 3 can move radially relative to the cowl 2 to vary the uniformity of the annulus 31. The movement permitted is very small and, until a substantial part of the link portion 7a is worn away, the link will serve to align the sections axially and concentrically relative to each other. The link 7 can readily be opened up (to the position shown in dotted lines) to permit separation of the liner sections and then closed up again to re-connect the sections.

The spacer 8 is a thin insert disposed between the liner 3 and the axially extending portion 2c of cowl 2. Spacer 8 is welded at 38 to the liner portion 2c and is disposed in radially aligned relation to link portion 7a. The spacers 8 serve the dual function of providing a bearing surface for the liner 3, and as a spacer insuring against the annulus 31 becoming less than a preselected size determined by the radial dimension of the spacer. Because of the slight radial clearance shown at 34 (Fig. 3) these functions come into effect when the link portion 7a has been eroded or corroded down to the point where the liner 3 comes into contact with the spacer 8.

The size and location of the links and spacers are very important to the practice of the present invention as can be seen from the following.

As previously mentioned, the air flows through the passage 30 and annulus 31 to cool the inner portion of the liner 3. It can readily be appreciated that the link 7 and spacers 8 which are disposed across the annulus obstruct the flow of air into the liner 3 at the portion of the liner where they are located. Immediately downstream from these obstructions only a very small area of liner wall is shielded from the stream of cooling air. It is apparent that the size of any "hot spot" formed by using a thin link and spacer, as shown, is very small. To further reduce the possibility of "burn out" of the liner due to the "wake" caused by the air flowing around these obstructions, the links and spacers are located in axial alignment with the air inlet holes 6, as described more particularly in the copending application of D. C. Berkey, Serial No. 525,477 filed August 1, 1955. This location of the link 7 substantially eliminates the place where the "hot spot" would exist with the present location and design of the novel connecting structure.

The flexibility of the wire links 7 permits ready adjustment of the liner sections relative to each other to secure uniformity of the annuli formed between them. Two diametrically opposite links (for instance the vertically disposed ones) can be bent slightly in a circumferential direction as indicated by the arrows in Fig. 2 to adjust the annulus clearance at the horizontal location 20 (Fig. 2). This clearance adjustment procedure is repeated with the other opposite pairs of links. With this arrangement, a more perfect annulus can be secured than can be obtained with the large sheet metal clips or other types of connectors previously employed.

With this arrangement, the liner sections are very accurately located concentrically, while being free to expand radially relative to each other. The links 7 insure that the adjacent liner sections will be held exactly coaxial while freely permitting differential thermal expansion therebetween.

The adjacent liner sections 3, 4 and 4, 5 are connected together in the same manner across their respective annuli 32, 33 as that indicated for the cowl 2 and liner section 3.

The connecting means for the liner sections is subject to many modifications. Among the possible alternative forms are those illustrated in Figs. 4, 5, and 6.

The modification disclosed in Fig. 4 comprises a link 17 made of flat stock having a narrow width in a circumferential direction, perhaps on the order of 3/16 of an inch. The left-hand end portion 17e is welded or otherwise secured to the liner section 2 at 36. The right-hand end portion of the link 17 is a lug 17b defined between the shoulders 17c, 17d. The lug 17b extends through opening 3a until the shoulders 17c, 17d abut the outer surface of liner 3. The lug 17b fits in opening 3a with very little clearance and serves to concentrically align the sections 2, 3 relative to each other in the same manner as links 7 in Fig. 3. The end portions 17a of the links 17 thus positively locate the sectional liner 3 concentrically relative to cowl 2. That is to say, the opposite links 17 will tend to locate the portion of the cowl 2 midway therebetween concentrically relative to the liner 3 and the other links located therebetween will operate in the same manner as the links 7 in Fig. 3. However, it is noted that there is no spacer disposed between the cowl 2 and liner 3 as was the case in the arrangement shown in Fig. 3. A spacer is not required since the shoulders 17c, 17d serve the dual function heretofore performed by the spacer 8 by providing a stop for the movement of the sections 2, 3 relative to each other and as a wearing surface for the section 3 to contact in the event the lug 17b fails to maintain the liners 2, 3 concentric relative to each other. Thus the six links disposed circumferentially around the liner will locate the liner 3 concentrically relative to the cowl 2. The lug 17b disposed through the opening 3a also locates the liner 3 axially relative to the cowl 2. Thus, the link 17 accomplishes both the function of axial and concentric alignment of the liner 3 relative to the cowl 2. A sectional liner using this type of link can be readily disassembled by moving the portion 17a into the retracted position shown in broken lines.

The modification illustrated in Fig. 5 is similar to Fig. 1, the main difference being that the spacer and link are secured together by a weld at 29. The spacer 23 has an axial extension 23a, which is welded as shown to the end portion 22a of link 22. If desired, the spacer 23 and link 22 could of course be made integral. This combination link-spacer is welded to the section 2 at 27, 28.

The connector modifications heretofore described were for liner sections connected together by a "link" spacer which can readily be opened up for disconnection of the sections and then closed up again to re-connect the sections. However, with some designs, the liner sections can be permanently secured together. In such applications, spacers of the type illustrated in Fig. 6 can be used. This type of connector 21 has a lug portion 21a disposed in the opening 3a of the liner 3 and a bottom portion 21b adapted to abut the end of the liner 2. The lug portion 21a serves to maintain the section 3 concentric relative to cowl 2 and connect the liner 3 axially relative to the cowl 2 in somewhat the same manner as hook portion 7a of link 7 (Fig. 3). The shoulder portion 21c of the link 21 disposed adjacent the lug 21a is equivalent to spacer 8 of Fig. 3 and serves to insure a minimum size of annulus between adjacent sections. A combustor liner utilizing this type of construction is assembled by first inserting the lug portions 21a of all the spacers into the recesses 3a, locating the section 3 relative to the cowl 2, and then welding the end portions 21d to the cowl 2 at 35.

All these various connectors and spacers present a thin edge section to the flow and therefore offer very little resistance to the flow of air through the inner and outer annuli so that a very small portion of the inner and outer surface of the liner is shielded from the cooling air intended to flow across the liner surfaces.

The sectional liner disclosed in Fig. 1 may be assembled in the following manner.

The spacers 8 are welded to the axially extending portion 2c of the cowl 2. There are preferably six of these, located in axial alignment with the primary air inlet holes 6. The links 7 are secured to the cowl 2 in an axial direction and are bent radially outward from the spacers 8. The links 7 are thus disposed in the dotted position shown in Fig. 3 to permit the liner 3 to be assembled into concentric alignment with the portion 2c of the cowl 2. Then the link portions 7a are bent inwardly so as to enter the opening 3a of liner 3, to fix the liner 3 axially and concentrically relative to the cowl 2. If, when thus assembled, the liner section 3 is found not to be exactly concentric relative to the cowl 2, the links 7 can be adjusted by bending circumferentially, as described above, to provide a precisely uniform annulus between the liner 3 and cowl 2. The adjacent liner sections are connected in a similar manner.

Upon completion of the assembly of the separate liner sections, the liner assembly can be inserted as a unit into the outer housing 1. During insertion of the liner, the wing supports 11 are located in slot 12c of slotted bolt 12 to positively locate the liner relative to the outer housing 1. This is done by rotating the liner and attached support 11 until the support contacts wall 12d of slot 12 (which it can since the bolt head is cut away at 12b) and then moving the liner axially along the slot.

It will be seen that the invention provides a sectional liner which is assembled and supported relative to the outer combustor housing by connectors and spacers which present a minimum of interference to the air flowing between the liner and the outer housing and the air flowing through the annuli formed between adjacent liner sections to cool the inside surface of the liner. This substantially unrestricted flow of cooling air to both sides of the liner prevents the deposition of carbon on the liner wall, which in turn prevents the creation of "hot spots." The links used for assembling the liner are readily disengageable, which provides for quick and easy disassembly and re-assembly of the liner when it is desired to replace any of the liner parts.

Tests show that this improved combustor structure is capable of operating efficiently through long periods without requiring cleaning, and has a long service life because free of the "burn out" tendency experienced with previous sectional liners. An indication of the extent of the overall improvement effected by the invention may be seen from the fact that whereas previous designs had a life of less than 200 hours without servicing or replacing, sectional liners constructed in accordance with the present invention have operated in gas turbine powerplants for over 2500 hours without difficulty.

It will be obvious to those skilled in the art that numerous other changes and substitutions of mechanical equivalents might be made in the construction and assembly of the various components of the liner assembly. Also, in the practice of the present invention it is not required that the links be located in axial alignment with the air inlet holes, or that there be exactly six links connecting the liner sections together. Other modifications include replacing the bolt 12 with another fastening means having a slot defining portion and securing the connector to the outer liner section and having it disposed in an opening defined by the adjacent inner liner section.

It is, of course, desired to cover by the appended claims all such modifications as fall within the true spirit and scope of the invention.

What I claim as new and desire to secure by Letters Patent of the United States is:

1. In a combustor for a thermal powerplant having a liner formed of separate annular sections and means supporting adjacent liner sections in concentric, radially spaced, telescopic relation to define an annular air inlet nozzle, said means comprising a series of circumferentially spaced axially extending connectors each having a first end portion secured to the outer surface of one liner section and a second end portion which overlies and is radially spaced from the outer surface of the other liner section, the second end of said connector terminating in a radially extending portion, said other liner section defining an opening adapted to receive said radially extending connector portion with a small peripheral clearance, whereby the radially extending connector portion is slidably disposed relative to the other liner section to permit differential thermal expansion between adjacent liner sections, the connectors having a small thickness in a circumferential direction whereby they present substantially no obstruction to the flow of cooling air into said nozzle and may be bent in a circumferential direction to adjust the nozzle.

2. In a combustion device of the type described, means for supporting adjacent liner sections in concentric, radially spaced, telescopic relation including a plurality of circumferentially spaced connectors secured to the outer surface of the inner liner section at a location spaced axially from one end of the inner section, each connector extending axially relative to the surface of the other liner section and terminating in a radially extending lug portion, said other liner section defining an opening adapted to receive said lug with a small peripheral clearance, whereby the lug is slidably disposed in said opening to permit ready removal of the lug to permit separation of the liner sections, the connector also defining at least one shoulder adjacent said lug portion which is adapted to abut the adjacent surface of the other liner section, whereby if the lugs should fail to maintain the sections concentric, said shoulders will serve to maintain a preselected minimum radial spacing between the liners to permit air to flow therebetween, said connectors having a relatively narrow cross section so that air flow between the liner sections is substantially unimpeded.

3. In a combustor for a thermal powerplant having a liner formed of separate annular sections and means supporting adjacent liner sections in concentric, radially spaced, telescopic relation to define an annular air inlet nozzle, said means comprising a series of circumferentially spaced axially extending connectors each having a first end portion secured to the outer surface of one liner section and a second end portion which extends between the opposite surfaces of the telescoped portions of the adjacent liner sections, the second end portion terminating in a radially extending lug portion, the other liner section defining an opening adapted to receive said lug with a small peripheral clearance, whereby the lugs can be adjusted to vary the annular nozzle opening and can be readily disengaged to disassemble the liner the connector also defining at least one shoulder adjacent said lug portion which is adapted to abut the inner surface of the other liner section, whereby, if the lug should fail to maintain the sections concentric, the shoulder will serve to maintain the minimum radial spacing between the liners to permit air to flow therebetween, the connector having a relatively narrow cross section so that air flow into the annular nozzle defined between the sections is substantially unimpeded.

4. A combustion device of the type described consisting of an outer housing containing an axially elongated liner defining a combustion chamber consisting of a liner formed of separate annular sections, a series of circumferentially spaced axially extending connectors supporting the adjacent liner sections in concentric, radially spaced, telescopic relation to define an annular air inlet nozzle, each of said connectors having a first end portion secured to the outer surface of one liner section and a second end portion which is radially spaced from the other liner section, said second end of the connector terminating in a radially extending portion, said other liner section defining an opening adapted to receive said radially extending connector portion with a small peripheral clearance, whereby the radially extending connector is slidably disposed relative to the other liner section to permit differential thermal expansion in a radial direction means supporting said liner relative to said outer housing, said means comprising a first member secured to a liner section and extending radially across the space between the liner and outer housing, a second member secured to the outer housing and defining a radially extending slot adapted to receive said first member, the depth of the slot being such that a small radial clearance is provided between the first member and the bottom of the slot whereby the liner is free to expand radially relative to the outer housing in response to increased temperatures, the connector and said first member having a very narrow cross section, whereby they present substantially no obstruction to the flow of cooling air into said nozzle.

5. In a combustor having an outer housing containing an axially elongated liner defining a combustion chamber substantially closed at one end and formed of separate annular sections, means supporting the adjacent annular sections in concentric, radially spaced, telescopic relation the telescoped portions of the adjacent liner sections defining an annulus adapted to receive cooling air for cooling the inside of the liner, said means comprising a series of link members spaced circumferentially around the liner and extending axially across said annulus, each of said links having an axially extending portion secured to the outer surface of the first liner section, overlying, and radially spaced from the outer surface of the second liner section, the axially extending portion of the link terminating in a radially extending portion, said second liner section defining an opening adapted to receive the radially extending portion with comparatively close circumferential clearance, an axially disposed spacer secured to the outer surface of the first liner section and located radially inward and spaced from the radially extending portion of said link, the link being of a small thickness in a circumferential direction, the thickness of said spacer being substantially equal to that of the link, whereby the flow of cooling air into said annulus is substantially unimpeded, said spacers serving to prevent the annulus from becoming less than a preselected minimum size equal to the radial dimension of the spacers in the event the links fail to maintain the sections concentric.

6. A combustor of the type described comprising an outer housing, an axially elongated sectional liner disposed within said housing and spaced therefrom to define an air supply passage, first means supporting the adjacent liner sections in concentric, radially spaced, telescopic relation and comprising a series of circumferentially spaced connectors, each connector being secured to the outer surface of one liner section and having an axially extending portion terminating in a radially extending portion, said axial portion overlying in radially spaced relation the outer surface of the other liner section, the other liner section defining an opening adapted to receive the radially extending portion with substantially no peripheral clearance, second means supporting at least one liner section relative to the outer housing, said second means including a plurality of circumferentially spaced axially disposed members secured to said liner and extending radially across the air supply passage, a plurality of bolts secured to the outer housing and having a head portion defining a radially extending slot each adapted to receive the outer end portion of one of said members and providing a small radial clearance space between the bottom of the slot and the member whereby the liner is free to expand radially relative to the housing in response to increased temperatures, said connectors and members being of a small thickness in a circumferential direction so they will not substantially obstruct the flow of air in the air supply passages.

7. In a combustor for a thermal powerplant having an outer housing containing an axially elongated liner defining a combustion chamber substantially closed at one end and formed of separate annular sections within the outer housing and spaced therefrom to define an annular combustion and cooling air supply passage with a first means for supplying air under pressure to said passage, a second means supporting the liner relative to the outer housing, said second means comprising a plate secured to at least one liner section and extending radially across said passage, said plate being axially disposed and having a very narrow radial cross section so that it presents substantially no obstruction to the flow of air through said passage, a fastener secured to the outer housing and having a head defining a radially extending slot adapted to receive said plate with a small radial clearance provided between the plate and bottom of the slot, whereby the liner is free to radially expand relative to the outer housing in response to increased temperatures, the liner including a first substantially cylindrical liner section having a discharge end portion cooperating with the adjacent upstream end portion of the next liner section to form an annular nozzle for projecting a sheet of cooling and insulating air along the inner surface of the next adjacent section, a third means supporting the adjacent liner sections in concentric, radially spaced, telescopic relation including a connector secured to the outer surface of the first section and extending in an axial direction across said nozzle and terminating in a radially extending portion, an opening defined by the other liner section adapted to receive the radially extending portion with a comparatively close peripheral clearance whereby the liner sections are axially and concentrically aligned relative to each other, a spacer secured to the outer surface of said first liner section, which spacer is radially spaced from said radially extending portion, the spacer serving to maintain a minimum nozzle opening in the event the connectors fail to maintain the adjacent liner sections in concentric alignment, the connector and spacer having a small thickness in a circumferential direction whereby they present substantially no obstruction to the flow of cooling air into said annular passage.

References Cited in the file of this patent

UNITED STATES PATENTS

| | | |
|---|---|---|
| 968,724 | Wilstam | Aug. 30, 1910 |
| 2,268,464 | Seippel | Dec. 30, 1941 |
| 2,547,619 | Buckland | Apr. 3, 1951 |

FOREIGN PATENTS

| | | |
|---|---|---|
| 709,654 | Great Britain | June 2, 1954 |